June 18, 1940.                E. O. MUELLER ET AL                2,205,219
                                RAILWAY MOTOR FRAME
                               Filed April 14, 1938          3 Sheets-Sheet 1
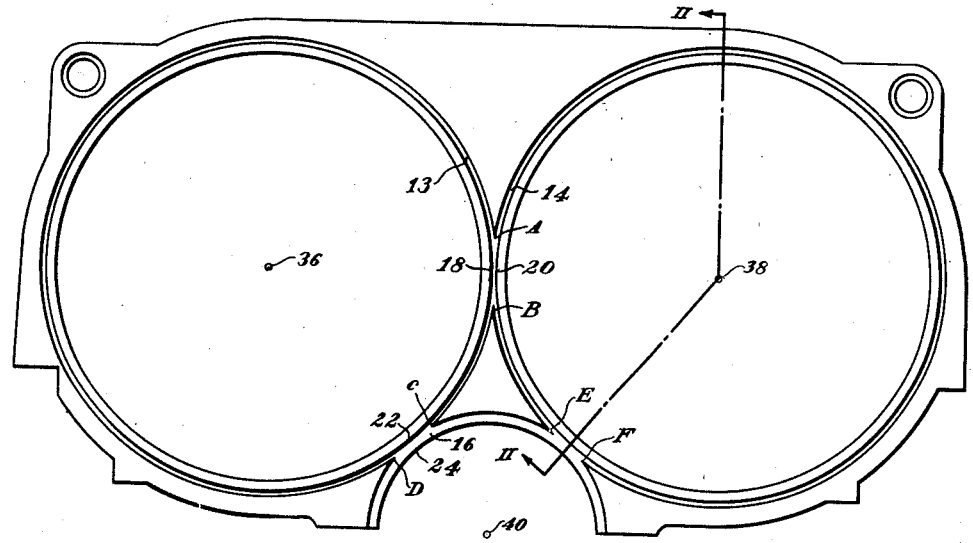
Fig. 1.
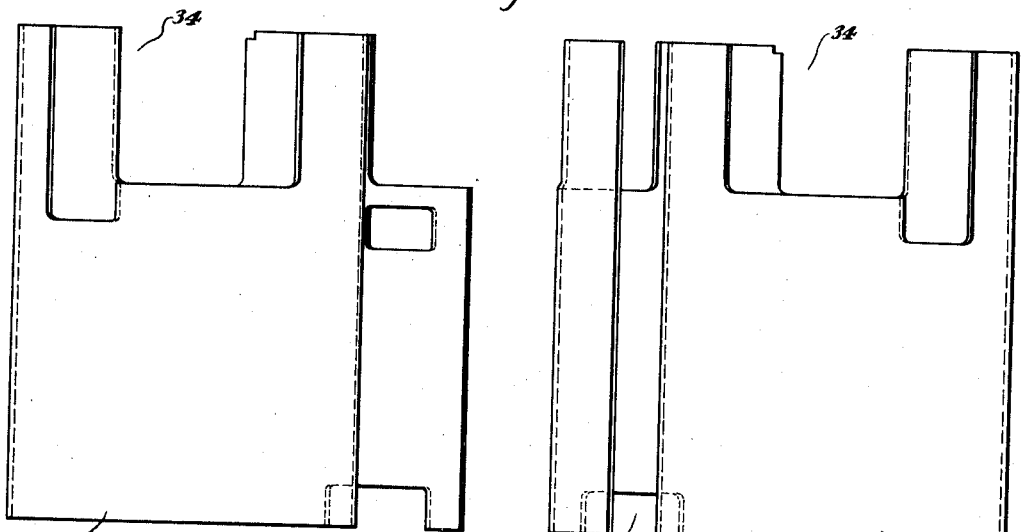
Fig. 3.                                          Fig. 4.
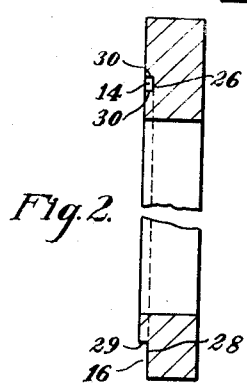
Fig. 2.
WITNESSES:                                         INVENTORS
C. F. Oberheim.                               Erich O. Mueller &
B. L. Zangwill                                David B. Charters.
                                              BY
                                                 O. B. Buchanan
                                                  ATTORNEY June 18, 1940.  E. O. MUELLER ET AL  2,205,219
RAILWAY MOTOR FRAME
Filed April 14, 1938  3 Sheets-Sheet 2

WITNESSES:
C.F. Oberheim
B.L. Zangwill

INVENTORS
Erich O. Mueller &
David B. Charters.
BY
O.B. Buchanan
ATTORNEY

June 18, 1940.  E. O. MUELLER ET AL  2,205,219
RAILWAY MOTOR FRAME
Filed April 14, 1938  3 Sheets-Sheet 3

WITNESSES:

INVENTORS
Erich O. Mueller &
David B. Charters.
BY
ATTORNEY

Patented June 18, 1940

2,205,219

UNITED STATES PATENT OFFICE 2,205,219

RAILWAY MOTOR FRAME

Erich O. Mueller, Irwin, and David B. Charters, Pittsburgh, Pa., assignors to Westinghouse Electric & Manufacturing Company, East Pittsburgh, Pa., a corporation of Pennsylvania Application April 14, 1938, Serial No. 201,940

18 Claims. (Cl. 105—133)

In the application of electric motors for railway traction, the space available for the mounting of the motors is limited by the distance between the driving wheels and the structure of the truck. The former is rendered inflexible by the track gauge which is standard, while the latter is fixed by the vehicle underframe in the upward direction and permissible clearance above ground in the downward direction. As the demand for more and more powerful driving motors increases with no proportional increase in the available mounting space for the motor, this space must be utilized to the best possible advantage in order that a maximum size of motor may be mounted therein.

It is accordingly an object of our invention to construct a motor frame utilizing this available space in a most efficient manner. Referring more particularly to twin motors, we conserve space by using only a single thickness of iron between the abutting motor frames and between the motors and quill seat.

An additional requisite in the powerful drives required by railway motors, and particularly twin motors, is the accurate alignment or positioning of what is known as the gear centers. The enormous amount of power that must be transmitted and the difficult conditions under which such power is transmitted make accuracy of alignment imperative, for inaccurate alignment is one of the causes of undue wear upon the gears or bearings with possible failure of these parts. By our construction we are able accurately to describe the distances between the gear centers and we obtain the minimum distances possible without affecting the rating of the individual motors.

It is accordingly another object of our invention to provide a construction and assembly of a twin motor frame which will accurately align the gear centers.

While stringent requirements are necessary for electric railway traction, nevertheless the cost thereof must be kept sufficiently low so as to compete successfully with other types of motive power. One item of cost is the weight of the motor for any unnecessary weight not only increases the cost of the motor, but also increases the "dead weight" of the train.

It is accordingly still another object of our invention to construct a motor frame economically, and to maintain its weight low.

While we have described our invention as embodied in a twin railway motor, many features of our invention are also applicable to other types of motors, and we do not desire to be limited by the particular motor we have chosen as the specific embodiment in which to describe the features and principles of our invention as required by the patent statutes.

Other objects and features of our invention will be apparent from the following description thereof, in the drawings of which:

Figure 1 is an elevational view of an end plate of our twin motor frame.

Fig. 2 is a cross-sectional view thereof on the line II—II.

Fig. 3 is a plan view of one of the barrel members of our twin motor frame.

Fig. 4 is a plan view of a second barrel member of our motor frame.

Figure 5:
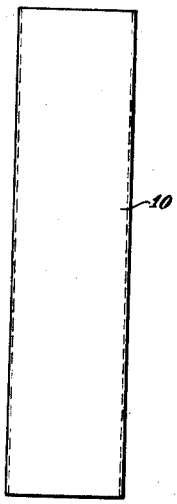
Fig. 5 is a plan view of a third barrel member of our motor frame.

The twin motor frame comprises end plates 2 and 4, barrel members 6, 8 and 10, and a quill seat 12. The frame is completed by various supporting rods or noses, reinforcing ribs and the like which are determined largely by the type of truck on which the motor unit is mounted, and forms no particular part of our invention. Only such ribs, noses and the like as are necessary to describe our invention will be indicated as the description progresses.

The end plates are each made from a flat rolled steel plate, and impression of the size of the motor unit may be gathered from the fact that, for a particular embodiment, each plate is approximately 71 inches by 37 inches of 1½ inch steel stock and weigh in the neighborhood of 1000 pounds before machining operations. The motor unit itself is rated at 1250 H. P. per twin motors.

Each end plate is first trimmed by burning along the general outline shown in Fig. 1. It will be observed that what was originally a rectangular plate has its corner portions and sides trimmed as much as possible consistent with the required strength. Left and right holes are then burned out of the plate as well as a semicircular hole for the quill seat. We then prefer to machine the bores in the end plates round in a three-bar mill, although any other appropriate machinery may be used. In machining of the end plate the bores are trimmed and grooves 13, 14 and 16 are cut concentric with the bores.

One end plate has its bores machine trimmed of such size that the stator assemblies of the motors can be inserted through them. It is not so essential to so trim the bores of the other end plate which can, therefore, be of smaller diameter. However, it is essential that the grooves of both end plates be turned on accurate centers which correspond to the gear centers.

The centers of the bores or grooves are chosen to yield grooves that overlap with substantially only a single thickness of width present on the line of centers. This overlapping is particularly shown at the intersection of the motor barrel grooves 13 and 14 and comprises an area common to both grooves having convex sides of a short dimension between points 18 and 20 on the line of centers, and a long dimension between points A and B along a perpendicular to the line of centers; and at the intersections of the motor barrel grooves and the quill seat groove, each of which comprises an area common to the intersecting grooves, and also with convex sides of a short dimension between points 22 and 24, or the equivalent, on the line of centers, and a long dimension between the points C and D, or the equivalent, along a perpendicular to the line of centers. The grooves are symmetrical and concentric with the bores so that the same machining operations and set up can be used to make both plates. Special care, however, should be taken in order that their bottom portions 26, 28 are substantially flat, and their side walls 29 and 30 cylindrical. Fig. 2 shows the groove 14 as having perpendicular side walls 30, the side walls of groove 13 corresponding to those of groove 14. The distance between the sides 30 is chosen only slightly greater than the thickness of the barrel members that are to be inserted therein.

The barrel members 6, 8 and 10 which comprise the housings for the operating parts of the motors, are formed of flat rolled steel plates. In our construction two flat plates of the proper size are the source from which the barrel members 6, 8 and 10 are ultimately obtained. The width of the flat plates is chosen to be that of the desired distance between the end plates of the motor frame as completely assembled plus the depth of the grooves of each plate. The opposite sides of each plate which fit into the grooves are machined accurately to the proper dimensions required when fitted into the grooves of the end plates, and are machined as substantially flat and as parallel as it is possible to obtain consistent with economical production.

Figure 6:
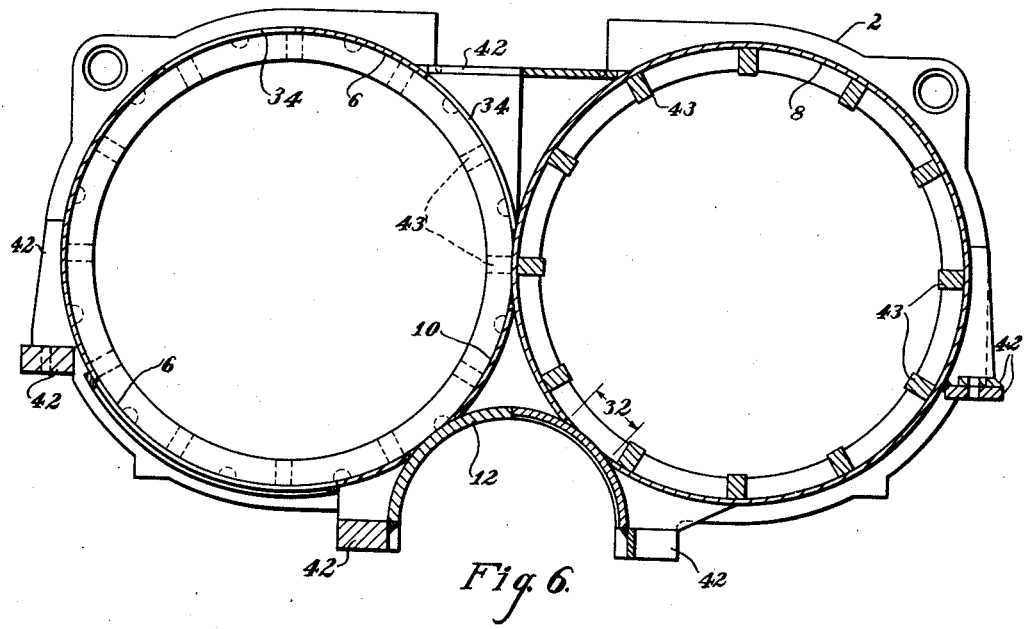
Fig. 6 is a cross-sectional view of our motor frame on the line VI—VI of Fig. 7.

The barrel member 8 is rolled preferably on a tire-mill, from one of these plates into an almost closed circular cylinder as shown more particularly in Fig. 6 and is hereinafter referred to, for convenience, as an O member or the like. The distance 32 separating the open ends of the O correspond substantially to the distance between the points E, F. However, we prefer to make this distance 32 slightly larger than the distance between the points E, F for a purpose to be hereinafter apparent.

A second flat plate is also rolled to a particylinder of circular cross section, and is hereinafter referred to, for convenience, as a C member or the like. The space between the open ends of the C member is equal approximately to the sum of the distances between points A, B and C, D. This barrel member is then cut into two segments, one of which forms the barrel member 6 and the other barrel member 10. We prefer to so construct the two barrel members 6 and 10 out of one C barrel for the sake of economy, although it is quite obvious that each of these barrel members may be severally rolled or formed.

Figure 7:
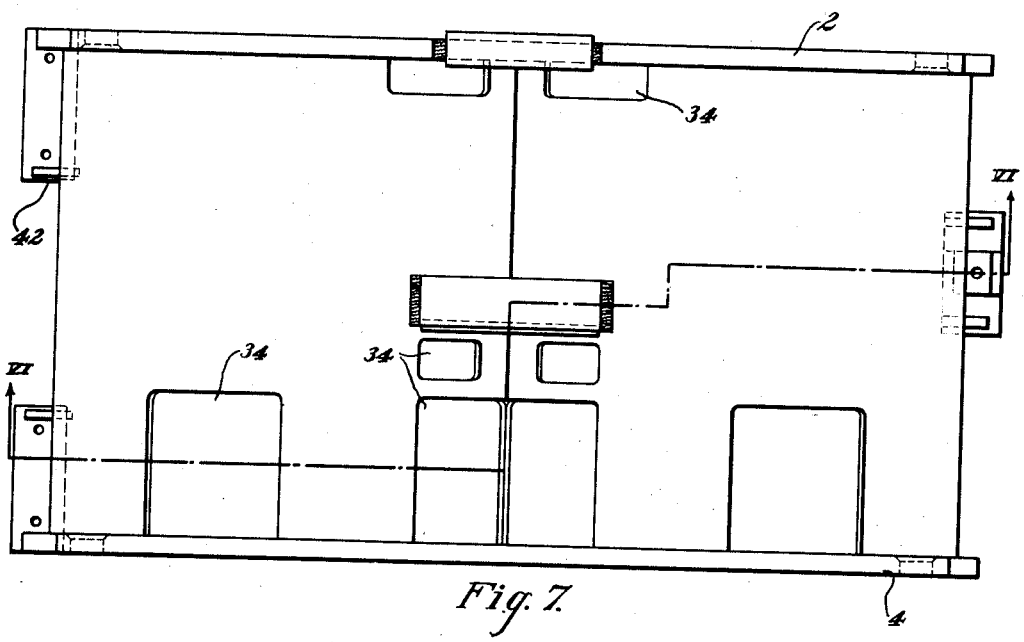
Fig. 7 is a top view of our motor frame.

The necessary holes in the barrel members for ventilating openings or commutator lid seats and the like are preferably burned out of the barrels after rolling and before their assembly into the frame. In Figs. 6 and 7 such holes are generally indicated in their entirety by the reference numeral 34.

The quill seat 12 is formed in the same manner as are the barrel members 6 and 10, that is, a flat rolled steel plate of proper thickness is first machined with its sides flat and parallel and then rolled or formed to the proper semicircle.

In one manner of assembling the frames, one of the end plates is placed upon the ground in a horizontal position with grooves upward. The barrel members 6, 8 and 10 and quill seat 12 are then inserted in their corresponding grooves in their proper positions. Reference may be had to Figs. 1 and 6 to show the relationship of the positions of the barrel members and quill seat. The barrel member 8 occupies the groove 14 with the open ends thereof in juxtaposition to the surface of the quill seat at the points E and F. The barrel member 6 extends from approximately the point A to approximately the point D while the barrel member 10 extends from approximately the point C to approximately the point B. The second end plate, grooves downward, is then placed on top of the structure thus far assembled with the centers of its bores substantially aligned axially with those of the bottom plate, and with the barrel members and quill seat fitting snugly into their mating grooves. Ordinarily, the weight of the members is sufficient to line the parts, but we prefer to apply clamping pressure to the end plates as a matter of precaution. Because the groove bottoms 26, 28 and 29 are flat and lie in a plane, the flat and parallel sides of the barrels and quill seat will tend to automatically align the end plates in parallel planes in spite of any weaving of the barrel members or quill seat that might occur during their preparation. It should be noted that the open ends of the barrel members permit slight movement thereof for their proper disposition in the grooves.

We desire to emphasize this self-assembling and aligning feature of our construction. The parallel sides of the barrel members and quill seat automatically determine proper distances between the end plates when their flat sides abut the bottom of the grooves. Moreover, because of the cooperating mating faces of the grooves with the barrel members and quill seat, the centers 36, 38 and 40 of the bores on both end plates also are automatically aligned axially and accurately so.

While the unit is clamped to assure proper alignment, the parts are tack welded to maintain their assembly after clamping is removed. The different reinforcing ribs, supporting noses and the like indicated generally and in their entirety by the reference character 42 are also tack welded to the assembly. Keys 43, upon which the stator assembly is later secured, may also be welded into place. The frame may then be placed upon a welding manipulator and all welding required to obtain a rigid and strong structure performed.

Particularly heavy weld joints join the ends of the barrel member to the adjacent barrel member or quill seat along the lines parallel to the axes of the bores that join the corresponding like points A, B, C, D, E, and F of the two plates.

By this welding each barrel member in effect forms a complete circular iron cylinder with a minimum distance between their centers. For example, the distance between the centers 36 and 38 is kept to a minimum for the reason that only one thickness of iron, that of the barrel 8, is interposed, whereas if the barrel member 6 had been continuous at the line of centers, as has been the previous practice to the best of our knowledge, two thicknesses of iron would have been interposed between the centers 36 and 38. In the same way the center distances 36 to 40, and 38 to 40 are separated only by the thickness of the quill seat. While only a single thickness of iron serves two barrel members or a barrel member and quill seat, nevertheless in effect the motor barrels are completely circular and the necessary rigidity and strength and other essential properties are not sacrificed.

We prefer to split the motor barrels rather than the quill seat for the reason that the quill seat is of considerably heavier stock from that of the barrels and subjected to greater stresses, although it is obvious that if desired the quill seat may be split and the barrels made continuous.

Figure 8:
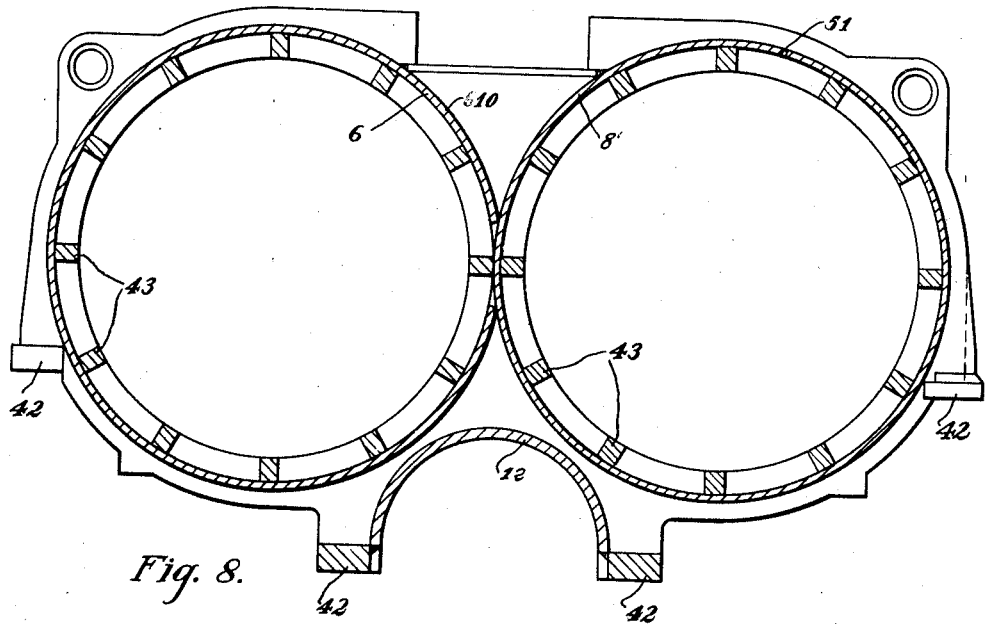
Fig. 8 shows a modification in cross-sectional view of a motor frame and depicts a second type of barrel member assembly.

In Fig. 8 we have shown a modification of a twin motor wherein the quill seat is not unitary therewith. This structure is particularly adaptable where the space in the direction in the quill seat is not limited and design purposes make such structure preferable. It will be observed that the barrel member 8' is substantially a complete O while the barrel member 910 is C-shape. I prefer, however, to have the barrel member 8' split as at 51 to allow for proper assembly between the end plates, after which all joints may be properly closed by welding.

While we have described our invention as applied to a twin motor with circular barrel members, it is obvious that the self-aligning and self-assembly features are applicable to other types of motors, and we do not desire to be limited to circular grooves and corresponding barrel members except as required by the prior art. Moreover, while we have shown abutting flat surfaces between the grooves and the fitting barrel members and quill seat, it is quite obvious that any appropriate mating surfaces or joints may be utilized to accomplish the features of our invention. We therefore desire the term "flat" to include such surfaces or joints except as required to be limited to flat surfaces by the prior art.

We claim as our invention:

1. A frame for a railway drive of a twin motor comprising end plates, each having at least two round bores and surrounding concentric grooves, said grooves having finite widths and intersecting to form a common area, said end plates being disposed with their grooves facing each other; each of said plates having a third semi-circular groove of finite width and intersecting the two other of said grooves to form a common area with each; a semi-cylindrical quill-seat member extending between said end plates and fitting said semi-circular grooves, a parti-cylindrical motor-housing member extending between said end plates and fitting a pair of said other grooves, one in each plate, said parti-cylindrical member having its open ends in proximity to said semi-cylindrical member and one of the last said common areas, a second parti-cylindrical motor-housing member extending between said end plates and fitting the remaining pair of said grooves, one in each plate, said second parti-cylindrical member having one of its open ends in proximity to said semi-cylindrical member, the other of the second mentioned common areas, and the first mentioned common area, a third motor-housing member extending between said end plates and having ends terminating in proximity to the last two mentioned areas on the sides opposite those at which said second member terminates, and weld joints securing said members into an integral unit.

2. The structure of claim 1 in which said end plates are parallel and the axes joining the centers of the pairs of said grooves into which each of said members fits, are parallel.

3. A frame for a railway drive of the twin motor type comprising two end plates, each having at least two bores and surrounding grooves of finite width, said grooves intersecting to form a common area, said plates being spaced and disposed with their grooves facing, a first motor-housing member extending between said plates and having sides conforming to the shape of a groove in each of said plates and fitting therein, said member being continuous through said areas, a second motor-housing member extending between said plates and having sides conforming to the shape of the other of said grooves in each of said plates and fitting therein, said second member being discontinuous in proximity to said first member and at said areas and welded to said first member along the lengths thereof.

4. The structure of claim 3 in which said end plates are parallel.

5. A frame for a railway drive of the twin motor type comprising complementary end plates, each having at least two bores and surrounding circular grooves, said grooves having finite widths and intersecting to form a common area; said end plates being disposed with their grooves facing each other, the bottom of each of said grooves lying in a plane; a substantially cylindrical motor-housing member and a parti-cylindrical motor-housing member, each having its sides parallel and flat; said members fitting said grooves with the open ends of the said parti-cylindrical member in proximity to the first said member and said common areas, means fastening said open ends to the first said member, and means fastening said members to said end plates.

6. A frame for a railway drive of the twin motor type comprising complementary end plates, each having at least two bores and surrounding circular grooves, said grooves having finite widths and intersecting to form a common area, said grooves being of predetermined form; said end plates being disposed with their grooves facing each other; a substantially cylindrical motor-housing member and a parti-cylindrical motor-housing member, each of said members having its side extremities machined to correspond to the form of the said grooves into which it fits; said members mating said grooves with the open ends of the said parti-cylindrical members in proximity to the first said member and said common area, means fastening said open ends to the first said member, and means fastening said members to said end plates.

7. The structure of claim 6 in which said end plates are parallel.

8. A frame for a railway drive of the twin motor type comprising two parallel end plates, each having at least two round machine-finished bores and surrounding, concentric, circular grooves, said plates being spaced and disposed with their grooves facing, a first motor-housing barrel member extending between said plates and having sides to conform to the shape of a groove in each of said plates and fitting therein, and of an extent equal to the distance between said plates plus the depth of the last said grooves; and a second motor-housing barrel member extending between said plates and having sides to conform to the shape of the others of said grooves, one in each of said plates, and fitting therein, and of an extent equal to the distance between said plates plus the depth of the last said grooves.

9. A frame for a railway drive of the twin motor type comprising two parallel end plates, each having two, similarly-disposed, round bores and a semi-circular bore, and surrounding, concentric, circular grooves substantially tangent to each other, said plates being spaced and disposed with their grooves facing and aligned to thereby provide three parallel axes between their centers, a pair of motor-housing members and a quill-seat member of an extent equal to the space between said plates plus the depth of two aligned grooves, each of said members having parallel sides and fitting a pair of aligned grooves.

10. The structure of claim 9 wherein said grooves on each plate overlap, and a said member in one groove is continuous through said overlapping portion and a said member in the overlapping groove is discontinuous at said overlapping portion, and weld joints between said members.

11. A frame for a railway motor drive, comprising two complementary end plates, each having at least one round, machine-finished bore, and a substantially semi-circular indentation, grooves about and concentric with said bore and said indentation, said plates being spaced and disposed with their grooves facing, a motor-housing barrel member extending between said plates and having sides to conform to the shape of the grooves about said bores, and fitting therein, and of an extent equal to the distance between said plates at said grooves plus the depth of the last said grooves, a quill-seat member extending between said plates and having sides to conform to the shape of the others of said grooves, fitting therein, and of an extent equal to the distance between said plates at said grooves plus the depth of the last said grooves.

12. The structure of claim 11 in which said end plates are parallel and the axes joining the centers of the pairs of said grooves into which each of said members fit are parallel, and the sides of said grooves are perpendicular to said end plates.

13. A frame for a railway drive of the twin electric motor type having a pair of contiguous motor housing-barrels of metal extending in the same general direction, said housing-barrels intersecting at lines above and below the line of centers between them, at least one of said housing-barrels being discontinuous between the intersecting lines, and welded to the other of said housing-barrels.

14. A frame for a railway electric motor driving unit comprising, in effect, two substantially tubular metal members, extending in the same general direction, one of said members comprising motor housing means, at least one of said members being split open axially to provide axially-directed edges spaced from each other, the other of said members having portions in proximity to said edges, said one member being secured, as by welding, to said portions of said other of said members by having the aforesaid edges secured, as by welding, to the metal of said other member.

15. A frame for a railway drive of the twin electric motor type having a pair of contiguous motor housing-barrels of metal extending in the same general direction, said housing-barrels intersecting at lines above and below the line of centers between them, at least one of said housing-barrels being discontinuous between the intersecting lines, and welded to the other of said housing-barrels, and the said other housing-barrel including a continuous portion between said intersecting lines, whereby said portion, in effect, is common to both said housing-barrels.

16. A frame for a railway drive of the twin electric motor type comprising, a pair of end plates, a pair of contiguous motor housing-barrels of metal extending in the same general direction, said housing-barrels intersecting at lines above and below the line of centers between them, at least one of said housing-barrels being discontinuous between the intersecting lines, and welded to the other of said housing-barrels, said end plates having grooves conforming in contour to the sides of said housing-barrels and which they fit.

17. A frame for a railway drive of the twin electric motor type comprising, a pair of end plates, a pair of contiguous motor housing-barrels of metal extending in the same general direction, said housing-barrels intersecting at lines above and below the line of centers between them, at least one of said housing-barrels being discontinuous between the intersecting lines, and welded to the other of said housing-barrels, and the said other housing-barrel including a continuous portion between said intersecting lines, whereby said portion, in effect, is common to both said housing-barrels, said end plates having grooves conforming in contour to the sides of said housing-barrels and which they fit.

18. A frame for a railway drive of the twin electric motor type comprising, a pair of end plates, a pair of contiguous metal motor housing-barrels extending in the same general direction, said housing-barrels intersecting at lines above and below the line of centers between them, at least one of said housing-barrels being discontinuous between the intersecting lines, and welded to the other of said housing-barrels, and the said other housing-barrel including a continuous portion between said intersecting lines, whereby said portion, in effect, is common to both said housing-barrels, said end plates having grooves conforming in contour to the sides of said housing-barrels and which they fit, said end plates each having bores inside said grooves.

ERICH O. MUELLER.
DAVID B. CHARTERS.